United States Patent
Hayashi

(10) Patent No.: US 7,664,513 B2
(45) Date of Patent: Feb. 16, 2010

(54) POSITIONING SYSTEM, TERMINAL DEVICE, POSITIONING DEVICE, CONTROL METHOD FOR TERMINAL DEVICE, CONTROL PROGRAM FOR TERMINAL DEVICE, AND COMPUTER-READABLE RECORDING MEDIUM FOR RECORDING CONTROL PROGRAM FOR TERMINAL DEVICE

(75) Inventor: Akifumi Hayashi, Misato-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/259,343

(22) Filed: Oct. 28, 2008

(65) Prior Publication Data

US 2009/0054083 A1 Feb. 26, 2009

Related U.S. Application Data

(62) Division of application No. 11/257,046, filed on Oct. 25, 2005, now Pat. No. 7,505,773.

(30) Foreign Application Priority Data

Oct. 27, 2004 (JP) ............................. 2004-311861

(51) Int. Cl.
*G01S 5/00* (2006.01)
(52) U.S. Cl. .................. 455/456.2; 455/12.1
(58) Field of Classification Search ............ 455/421, 455/456.1, 456.2, 456.6, 12.1; 342/357.01, 342/357.06
See application file for complete search history.

(56) References Cited

U.S. PATENT DOCUMENTS

2004/0021566 A1    2/2004   Hayashi et al.

FOREIGN PATENT DOCUMENTS

| JP | 07-140223 A | 6/1995 |
| JP | 2000-131415 A | 5/2000 |
| JP | 2001-004734 A | 1/2001 |
| JP | 2002-328157 A | 11/2002 |
| JP | 2003-070051 A | 3/2003 |
| JP | 2003-075526 A | 3/2003 |
| JP | 2003-344524 A | 3/2003 |
| JP | 2004-013840 A | 1/2004 |

*Primary Examiner*—Sam Bhattacharya
(74) *Attorney, Agent, or Firm*—Global IP Counselors, LLP

(57) ABSTRACT

A positioning system capable of reducing the volume of data communication in a server positioning system is provided. A terminal device has the information for a positioning transmitting section and can transmit information for positioning containing the actually measured current positioning basic information and/or the estimated basic information to the positioning device. The amount of the estimated basic information is smaller than the amount of the current positioning basic information, thus, the amount of information that the terminal device transmits to the positioning device becomes smaller in the case where the terminal device transmits the estimated basic information with respect to the position information satellite having the difference within the allowable range compared to the case where it transmits only the actually measured current positioning basic information with respect to all of the position information satellites.

6 Claims, 13 Drawing Sheets

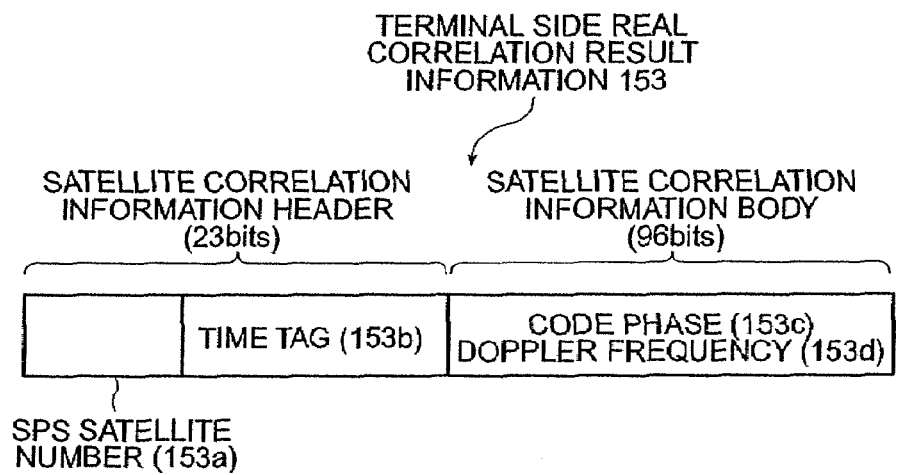
FIG. 5A
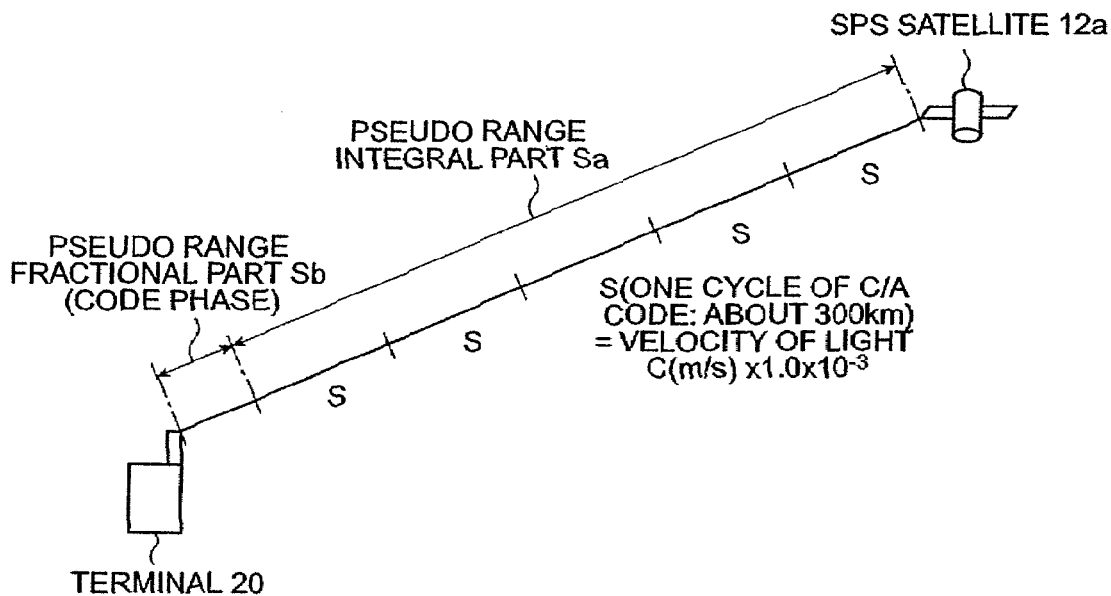
FIG. 5B
EQUATION A
$P1 = P0 + F0 \times (t1 - t0)$
P0: CODE PHASE OF SPS SATELLITE 12a AT TIME t0
F0: DOPPLER FREQUENCY OF SPS SATELLITE 12a AT TIME t0
t1: TIME ELAPSED FROM TIME t0 BY $\Delta t$ (t1 > t0)
FIG. 5C

POSITIONING SYSTEM, TERMINAL DEVICE, POSITIONING DEVICE, CONTROL METHOD FOR TERMINAL DEVICE, CONTROL PROGRAM FOR TERMINAL DEVICE, AND COMPUTER-READABLE RECORDING MEDIUM FOR RECORDING CONTROL PROGRAM FOR TERMINAL DEVICE

CROSS-REFERENCE TO RELATED APPLICATIONS

This application claims priority to U.S. patent application Ser. No. 11/257,046. The entire disclosure of U.S. patent application Ser. No. 11/257,046 is hereby incorporated herein by reference.

BACKGROUND OF THE INVENTION

1. Field of the Invention

The present invention generally relates to a positioning system. More specifically, the present invention relates to a positioning system, a terminal device, a positioning device, a control method for a terminal device, a control program for a terminal device, and a computer-readable recording medium for recording a control program for a terminal device for positioning a current position based on position related-signals from position information satellites.

2. Background Information

Conventionally, positioning systems for positioning the current position of a SPS receiver utilizing an SPS(Satellite Positioning System), for example, as a satellite navigation system have been put into practical use. Such positioning systems include a system for transmitting correlation result information that the SPS receiver has obtained by receiving signals from the SPS satellites to an external positioning server and allowing the positioning server to perform positioning of the current position of the SPS receiver (hereinafter, referred to as "server positioning system"). (Such a system is shown in Japanese Patent Application Publication No. 2000-131415, especially FIG. 1 etc. Japanese Patent Application Publication No. 2000-131415 is hereby incorporated by reference. Here, the correlation result information is information necessary for the positioning server to perform positioning computation of the current position of the SPS receiver, for example, carrier phase, code phase, Doppler frequency. This server positioning system is advantageous in that the processing load on the SPS receiver can be reduced because there is no need for the SPS receiver itself to perform positioning computation.

However, in the above described related technology, it is necessary to transmit the correlation result information of the positioning server for positioning the current position of the SPS receiver. This means that a large volume of data communication is generated in a service utilizing an application such as pedestrian navigation that requires one positioning per several seconds (s), for example. When the volume of data communication is large, there is a problem in that a communication charge increases for a service user.

Further, in the case where the above described service is provided to a large number of users, when volumes of independent data communication are large, equipment such as a server for handling the volumes is required and that brings significant disadvantages to service providers.

In view of the above, it will be apparent to those skilled in the art from this disclosure that there exists a need for an improved a positioning system, a terminal device, a positioning device, a control method for terminal device, a control program for terminal device, and a computer-readable recording medium for recording a control program for terminal device for positioning a current position based on position related-signals from position information satellites. This invention addresses this need in the art as well as other needs, which will become apparent to those skilled in the art from this disclosure.

SUMMARY OF THE INVENTION

Accordingly, an object of the patent invention is to provide a positioning system, a terminal device, a positioning device, a control method for a terminal device, a control program for a terminal device, and a computer-readable recording medium for recording a control program for a terminal device capable of reducing the volume of data communication in a server positioning system.

According to a first aspect of the patent invention, a positioning system includes a terminal device and a positioning device. The terminal device has a signal receiving section that receives position-related signals from a plurality of position information satellites. The positioning device is provided to position a current position of the terminal device. The terminal device has a positioning basic in formation generating section, a positioning basic information storing section, a timing section, a calculated positioning basic information generating section, a within or without allowable range determining section, an estimated basic information generating section, and an information for positioning transmitting section. The positioning basic information generating section generates positioning basic information containing pseudo ranges between the respective positioning information satellites and the terminal device based on the position-related signals The positioning basic information storing section stores the positioning basic information. The timing section measures time lapse from a previous generation time at which the positioning basic information at a previous time is generated. The calculated positioning basic information generating section generates calculated positioning basic information indicating a calculated value of current positioning basic information as positioning basic information at the present time based on the previous positioning basic information and the time lapse from the previous generation time. The within or without allowable range determining section determines whether a difference between the pseudo range of the actually measured current positioning basic information and the pseudo range of the calculated positioning basic information falls within an allowable range or not. The estimated basic information generating section generates estimated basic information based on a determination result of the within or without allowable range determining section for the positioning device to generate estimated positioning basic information based on the previous positioning basic information. The information for positioning transmitting section transmits information for positioning containing the actually measured current positioning basic information and/or the estimated basic information to the positioning device. The positioning device has an information for positioning receiving section, an estimated positioning basic information generating section, a positioning calculated section, and a positioning result information transmitting section. The information for positioning receiving section receives the information for positioning from the terminal device. The estimated positioning basic information generating section generates the estimated positioning basic information based on the estimated basic information. The positioning calculating section generates positioning result information by performing positioning calculation of the current position of the terminal device based on the actually measured current positioning basic information and/or the estimated positioning basic information. The positioning result information transmitting section transmits the positioning result information to the terminal device.

According to the aforementioned configuration, the terminal device can generate the calculated positioning basic information with the calculated positioning basic information generating section. The positioning basic information is information indicating a pseudo range as a distance between the position information satellite and the terminal device, for example. Further, it is well known that the current pseudo range can be calculated from the previous pseudo range for a short time.

However, in the case where the pseudo range obtained by calculation is largely different from the real pseudo range, when the positioning device uses the pseudo range obtained by calculation for positioning calculation, the positioning error of the current position of the terminal device becomes larger.

To address the problem, the terminal device has the validity determining section and can determine whether the difference between the actually measured current positioning basic information and the calculated positioning basic information falls within an allowable range or not. Thereby, the terminal device can obtain information to restrict the positioning device to perform positioning calculation using the pseudo range obtained by calculation.

Further, the terminal device has the estimated basic information generating section and can generate estimated basic information based on a determination result of the validity determining section for the positioning device to generate estimated positioning basic information based on the previous positioning basic information.

Here, the amount of the estimated basic information is smaller than the amount of the current positioning basic information. The current positioning basic information includes an identification code to identify the position information satellite, a time at which the positioning basic information is generated, and the above described pseudo range and a Doppler frequency, for example. Alternatively, the estimated basic information requires only information for the positioning device to generate the estimated positioning basic information, for example, a code indicating whether the estimated positioning basic information can be generated or not, an identification code to identify the position information satellite, and a time at which the positioning basic information is generated.

Further, since the terminal device has the information for positioning transmitting section, it can transmit information for positioning containing the actually measured current positioning basic information and/or the estimated basic information to the positioning device. As described above, since the amount of the estimated basic information is smaller than the amount of the current positioning basic information, the amount of information that the terminal device transmits to the positioning device becomes smaller in the case where the terminal device transmits the estimated basic information with respect to the position information satellite having the difference within the allowable range compared to the case where it transmits only the actually measured current positioning basic information with respect to all of the position information satellites, for example. Thereby, in the server positioning system, the volume of data communication can be reduced.

On the other hand, the positioning device can receive the information for positioning from the terminal device with the information for positioning receiving section. Further, it can generate the estimated positioning basic information based on the estimated basic information with the estimated positioning basic information generating section. Furthermore, the positioning device can perform positioning calculation of the current position of the terminal device based on the current positioning basic information and/or the estimated positioning basic information with the positioning calculating section.

According to a second aspect of the present invention, a terminal device includes a signal receiving section, a positioning basic information generating section, a positioning basic information storing section, a timing section, a calculated positioning basic information generating section, a within or without allowable range determining section, an estimated basic information generating section, and an information for positioning transmitting section that transmits information for positioning containing the actually measured current positioning basic information and/or the estimated basic information to the positioning device. The signal receiving section receives position-related signals from position information satellites. The positioning basic information generating section generates positioning basic information for the positioning by the positioning device based on the position-related signals. The positioning basic information storing section stores the positioning basic information. The timing section measures time lapse from a previous generation time at which the positioning basic information at a previous time is generated. The calculated positioning basic information generating section generates calculated positioning basic information indicating a calculated value of current positioning basic information as positioning basic information at the present time based on the previous positioning basic information and the time lapse from the previous generation time. The within or without allowable range determining section determines whether a difference between the pseudo range of the actually measured current positioning basic information and the pseudo range of the calculated positioning basic information falls within an allowable range or not. The estimated basic information generating section generates estimated basic information based on a determination result of the within or without allowable range determining section for the positioning device to generate estimated positioning basic information based on the positioning basic information at the previous time. The information for positioning transmitting section that transmits information to position containing the actually measured current positioning basic information and/or the estimated basic information to the positioning device.

According to the aforementioned configuration, as well as the configuration of the first aspect, the volume of data communication can be reduced in the server positioning system.

It is preferable that the allowable range is defined according to a positioning error requested for the positioning. When the positioning error of the positioning result by the positioning device falls within a range of positioning error requested by a user of the terminal device for the positioning by the positioning device, the positioning result by the positioning device can be used. In other words, the positioning by the positioning device is valid.

Further, in order to allow the positioning error requested for the positioning to fall within the positioning error, the allowable range of the difference between the actually measured current positioning basic information and the calculated positioning basic information may be defined according to the positioning error requested for the positioning.

On this point, according to the configuration of the second aspect, since the allowable range is defined according to the positioning error requested for the positioning, the positioning result by the positioning device can be allowed to fall reliably within the positioning error requested for the positioning.

According to a third aspect of the present invention, a positioning device for positioning a current position of a terminal device has a signal receiving section that receives position-related signals from position information satellites. The positioning device includes an information for positioning receiving section, an estimated positioning basic information generating section, a positioning result information generating section, and a positioning result information transmitting section. The information for positioning receiving section receives information to position containing current positioning basic information as actually measured positioning basic information at the present time for the positioning and/or estimated basic information for generating estimated positioning basic information based on the previous positioning basic information from the terminal device. The estimated positioning basic information generating section generates the estimated positioning basic information based on the estimated basic information and the previous positioning basic information. The positioning result information generating section generates positioning result information by performing positioning calculation of the current position of the terminal device based on the current positioning basic information and/or the estimated positioning basic information. The positioning result information transmitting section transmits the positioning result information to the terminal device.

According to the aforementioned configuration, the positioning device can receive information for positioning containing the current positioning basic information and/or the estimated basic information from the terminal device.

As described above, since the amount of the estimated basic information is smaller than the amount of the current positioning basic information, the amount of information that the terminal device transmits to the positioning device becomes smaller in the case where the terminal device transmits the estimated basic information with respect to the position information satellite having the difference within the allowable range compared to the case where it transmits only the actually measured current positioning basic information with respect to all of the position information satellites, for example. Thereby, in the server positioning system, the volume of data communication can be reduced.

According to a fourth aspect of the present invention, a control method for a terminal device includes: a calculated positioning basic information generating step at which a terminal device having a signal receiving section that receives position-related signals from position information satellites, a positioning basic information generating section that generates positioning basic information for the positioning by the positioning device based on the position-related signals, a positioning basic information storing section that stores the positioning basic information, and a timing section that measures time lapse from a previous generation time at which the positioning basic information at a previous time is generated generates calculated positioning basic information indicating a calculated value of current positioning basic information as positioning basic information at the present time based on the previous positioning basic information and the time lapse from the previous generation time; a within or without allowable range determining step at which the terminal device determines whether a difference between the pseudo range of the actually measured current positioning basic information and the pseudo range of the calculated positioning basic information falls within an allowable range or not; an estimated basic information generating step at which the terminal device generates estimated basic information based on a determination result at the within or without allowable range determining step for the positioning device to generate estimated positioning basic information based on the previous positioning basic information; and an information for positioning transmitting step at which the terminal device transmits information for positioning containing the actually measured current positioning basic information and/or the estimated basic information to the positioning device.

According to a fifth aspect of the present invention, a control program for a terminal device allows a computer to execute: a calculated positioning basic information generating step at which a terminal device having a signal receiving section that receives position-related signals from position information satellites, a positioning basic information generating section that generates positioning basic information for the positioning by the positioning device based on the position-related signals, a positioning basic information storing section that stores the positioning basic information, and a timing section that measures time lapse from a previous generation time at which the positioning basic information at a previous time is generated generates calculated positioning basic information indicating a calculated value of current positioning basic information as positioning basic information at the present time based on the previous positioning basic information and the time lapse from the previous generation time; a within or without allowable range determining step at which the terminal device determines whether a difference between the pseudo range of the actually measured current positioning basic information and the pseudo range of the calculated positioning basic information falls within an allowable range or not; an estimated basic information generating step at which the terminal device generates estimated basic information based on a determination result at the within or without allowable range determining step for the positioning device to generate estimated positioning basic information based on the positioning basic information at the previous time; and an information for positioning transmitting step at which the terminal device transmits information for positioning containing the actually measured current positioning basic information and/or the estimated basic information to the positioning device.

According to a sixth aspect of the present invention, a computer-readable recording medium for recording a control program for a terminal device allows a computer to execute: a calculated positioning basic information generating step at which a terminal device having a signal receiving section that receives position-related signals from position information satellites, a positioning basic information generating section that generates positioning basic information for the positioning by the positioning device based on the position-related signals, a positioning basic information storing section that stores the positioning basic information, and a timing section that measures time lapse from a previous generation time at which the positioning basic information at a previous time is generated generates calculated positioning basic information indicating a calculated value of current positioning basic information as positioning basic information at the present time based on the previous positioning basic information and the time lapse from the previous generation time; a within or without allowable range determining step at which the terminal device determines whether a difference between the pseudo range of the actually measured current positioning basic information and the pseudo range of the calculated positioning basic information falls within an allowable range or not; an estimated basic information generating step at which the terminal device generates estimated basic information based on a determination result at the within or without allowable range determining step for the positioning device to generate estimated positioning basic information based on the previous positioning basic information; and an information for positioning transmitting step at which the terminal device transmits information for positioning containing the actually measured current positioning basic information and/or the estimated basic information to the positioning device.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 5A to 5C are views of diagrams showing an example of terminal side real correlation result information etc.;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Since the embodiment as described below is a preferred specific example of the invention, technically preferred various limitations are imposed thereon, however, the scope of the invention is not limited to these modes without particular description that limits the invention in the explanation below.

Figure 1:
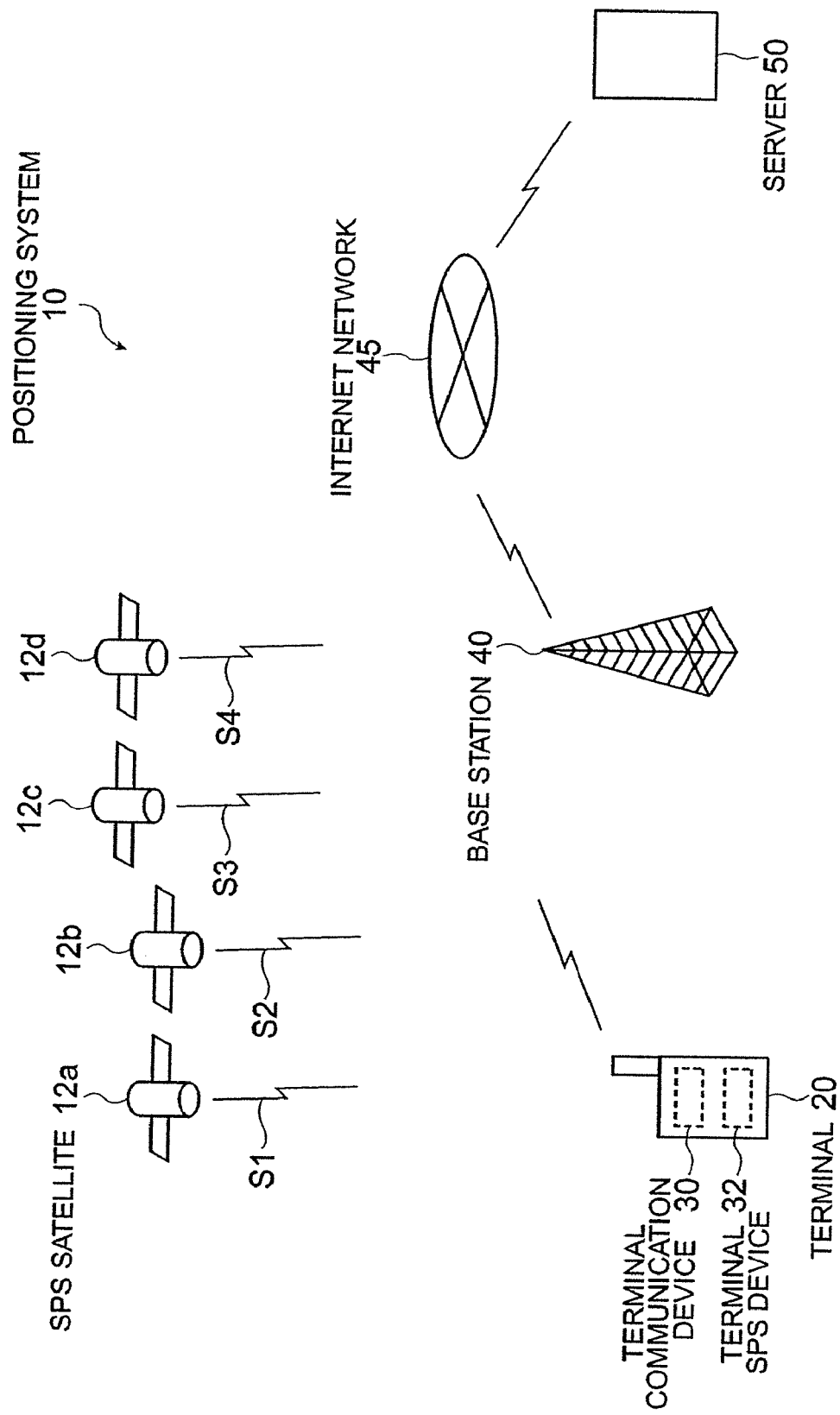
FIG. 1 is a view of a schematic diagram showing a positioning system according to a first preferred embodiment of the present invention.

FIG. 1 is a view of a schematic diagram showing a positioning system 10 according to a first preferred embodiment of the present invention. As shown in FIG. 1, the positioning system 10 has a terminal 20 as an example of a terminal device. This terminal device has a terminal SPS device 32 to receive signals S1, S2, S3, and S4, for example, as position-related signals from SPS satellites 12a, 12b, 12c, and 12d, for example, as position information satellites. The terminal SPS device 32 is an example of signal receiving section.

By the way, the terminal 20 is, for example, a cellular phone, however, PHS (Personal Handy-phone System), PDA (Personal Digital Assistance), or the like. Further, the number of SPS satellites 12a-12d is not limited to four, but may be three, or five or more.

As shown in FIG. 1, the positioning system 10 has a server 50. The server 50 is an example of a positioning device for positioning the current position of the terminal 20.

The above described terminal 20 has a terminal communication device 30 and can communicate with the server 50 via a base station 40 and an internet network 45.

Main Hardware Configuration of Terminal 20

Figure 2:
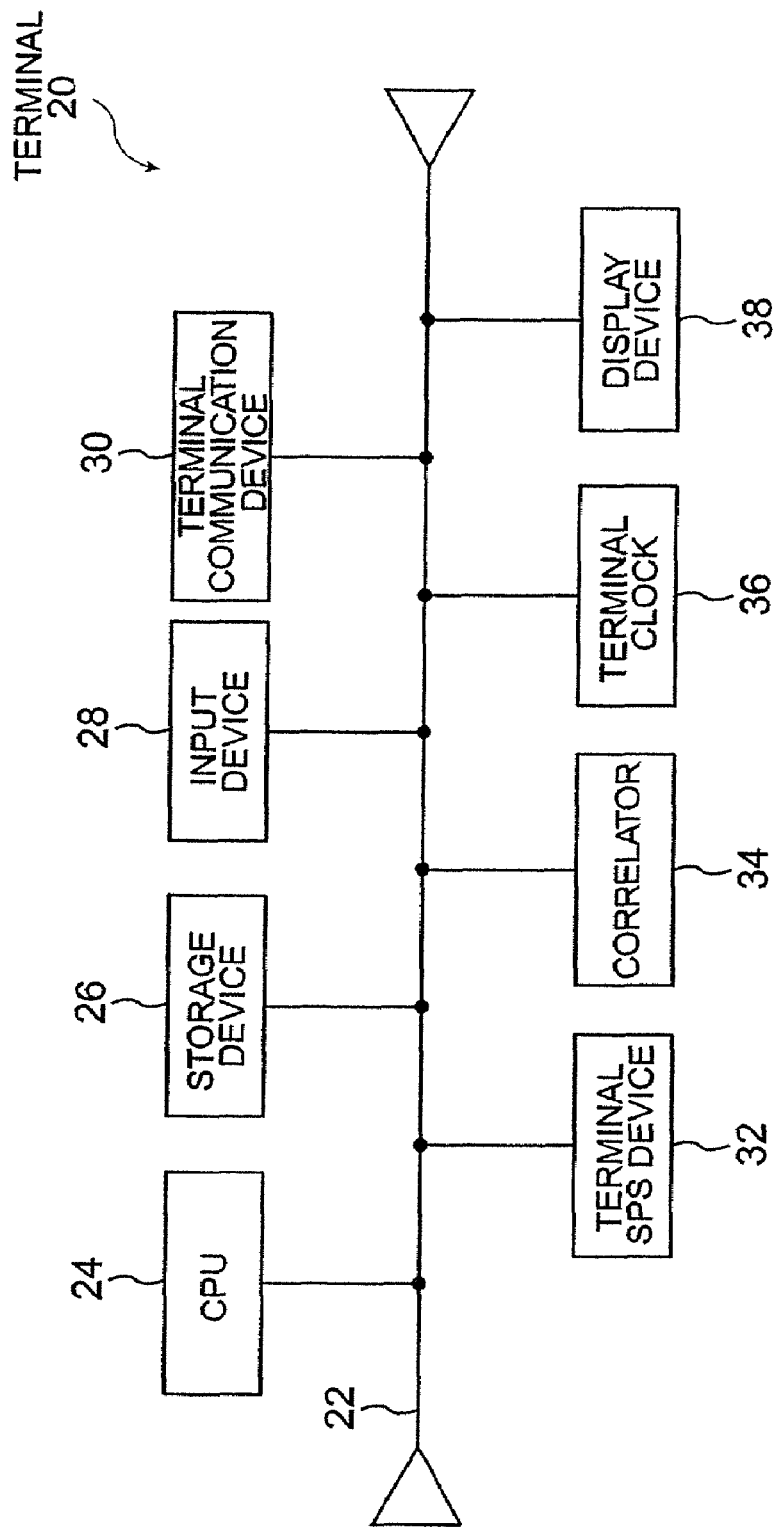
FIG. 2 is a view of a schematic diagram showing a main hardware configuration of a terminal of the positioning system.

FIG. 2 is a view of a schematic diagram showing a main hardware configuration of the terminal 20. As shown in FIG. 2, the terminal 20 has a computer and the computer has a bus 22. A CPU (Central Processing Unit) 24 and a storage device 26 are connected to the bus 22. The storage device 26 is, for example, a RAM (Random Access Memory), ROM (Read Only Memory), or the like. Further, an input device 28 for inputting various kinds of information is connected to the bus 22. Furthermore, the terminal SPS device 32 is connected to the bus 22. The terminal SPS device 32 includes a filter to receive selectively signals only in a certain band around a frequency of 1.5 gigahertz (GHz), for example, such as signals S1-S4 from the SPS satellites 12a-12d.

Moreover, a correlator 34 is connected to the bus 22. The correlator 34 separates the satellite signals S1-S4 from signals received by the terminal SPS device 32 and generates terminal side real correlation result information 153, which will be described later.

Furthermore, a terminal clock 36 for timing and a display device 38 to display various kinds of information etc. are connected to the bus 22.

Main Hardware Configuration of Server 50

Figure 3:
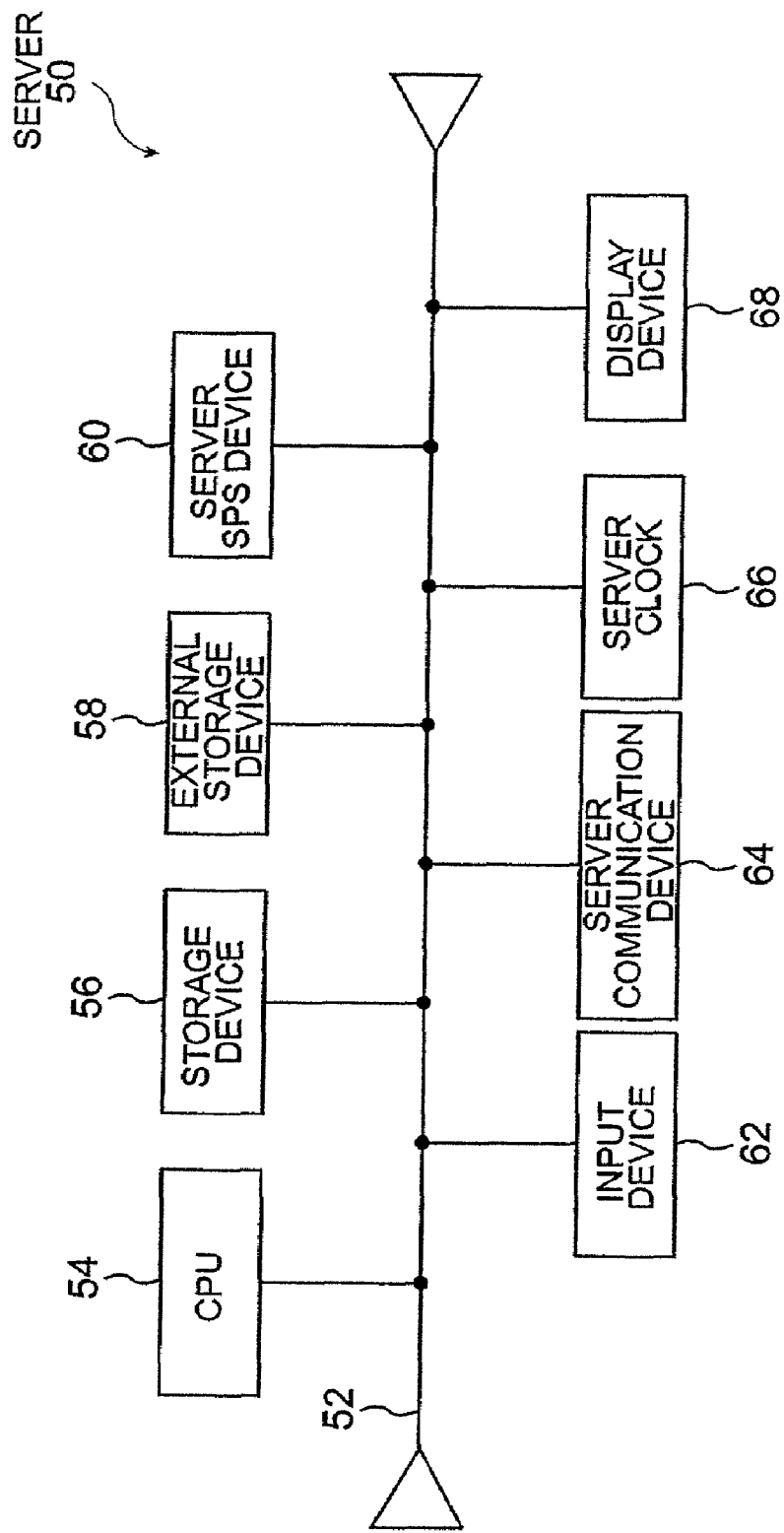
FIG. 3 is a view of a schematic diagram showing a main hardware configuration of a server of the positioning system.

FIG. 3 is a view of a schematic diagram showing a main hardware configuration of the server 50. As shown in FIG. 3, the server 50 has a computer and the computer has a bus 52. A CPU 54, a storage device 56 and an external storage device 58 are connected to the bus 52. The external storage device 58 is an HD (Hard Disk) or the like. Further, a server SPS device 60 to receive signals S1-S4. from the SPS satellites 12a-12d and an input device 62 to input various kinds of information are connected to the bus 52. Furthermore, a server communication device 64 for communication with the terminal 20 etc., a server clock 66 for timing, and a display device 68 for displaying various kinds of information are connected to the bus 52.

Main Software Configuration of Terminal 20

Figure 4:
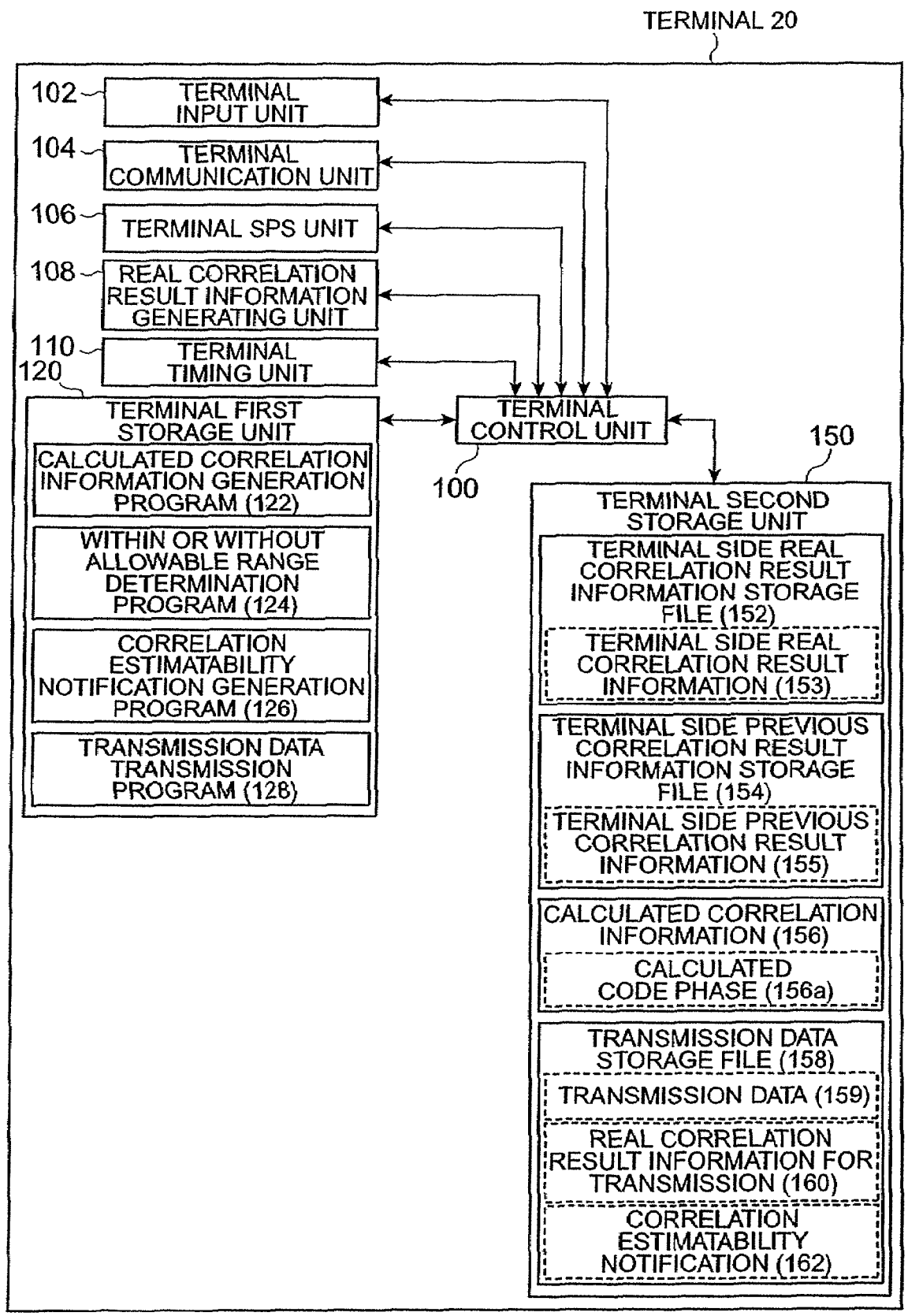
FIG. 4 is a view of a schematic diagram showing a main software configuration of the terminal.

FIG. 4 is a view of a schematic diagram showing a main software configuration of the terminal 20. As shown in FIG. 4, the terminal 20 has a terminal control unit 100 to control respective units, a terminal input unit 102 corresponding to the input device 28 in FIG. 2, a terminal communication unit 104 corresponding to the terminal communication device 30 in FIG. 2, a terminal SPS unit 106 corresponding to the terminal SPS device 32 in FIG. 2, a real correlation result information generating unit 108 corresponding to the correlator 34 in FIG. 2, and a terminal timing unit 110 corresponding to the terminal clock 36 in FIG. 2. As shown in FIG. 4, the terminal 20 has a terminal first storage unit 120 to store various kinds of programs and a terminal second storage unit 150 to store various kinds of information.

The real correlation result information generating unit 108 generates the terminal side real correlation result information 153 based on the signals S1-S4. (see FIG. 1) obtained by the terminal SPS unit 106 and stores the information in a terminal side real correlation result information storage file 152 of the terminal second storage unit 150.

FIGS. 5A to 5C are views of diagrams showing an example of the terminal side real correlation result information 153 etc. As shown in FIG. 5A, the terminal side real correlation result information 153 contains a satellite correlation information header of 23 bits and a satellite correlation information body of 96 bits. Further, the satellite correlation information header contains an SPS satellite number 153a to identify the respective SPS satellites 12a and a time tag 153b indicating the time when the real correlation result information generating unit 108 starts correlation processing. The time tag 153b indicates time in units of one millisecond (ms). Furthermore, the satellite correlation information body contains a code phase 153c and a Doppler frequency 153d.

Here, the code phase 153c will be described principally using FIG. 5B. In SPS positioning, the position of the terminal 20 is positioned based on distances (pseudo range Sa+Sb) from the plurality of SPS satellites 12a-12d. (see FIG. 1). This pseudo range includes a pseudo range integral part Sa and a pseudo range fractional part Sb. The pseudo range integral part Sa includes a set of an integral number of C/A (Coarse/Access) codes as basic units of SPS positioning. On the other hand, the pseudo range fractional part Sb is a fractional part of one C/A code.

In the embodiment, the code phase 153c means the pseudo range fractional part Sb. The pseudo range fractional part Sb is an example of a pseudo range.

Since the server 50 can identify the pseudo range integral part Sa if an approximate position of the terminal 20 is known, the server 50 can obtain the pseudo range Sa+Sb by obtaining the code phase 153c from the terminal 20.

In FIG. 5B, only the pseudo range between the SPS satellite 12a and the terminal 20 is shown. The pseudo ranges between the SPS satellites 12b-12d. and the terminal 20 are omitted, however, the pseudo range Sa+Sb is obtained with respect to each of the SPS satellites 12b-12d as is apparent from this disclosure.

Referring to FIG. 4, the above described terminal side real correlation result information 153 is information as a basis for positioning by the server 50. That is, the terminal side real correlation result information 153 is an example of positioning basic information, and the real correlation result information generating unit 108 is an example of a positioning basic information generating section. Then, the terminal side real correlation result information storage file 152 is an example of a positioning basic information storing section.

In the terminal side real correlation result information storage file 152, this time, the terminal side real correlation result information 153 to request the server 50 to perform positioning has been stored.

Further, terminal side previous correlation result information 155 as previous terminal side real correlation result information has stored in a terminal side previous correlation result information storage file 154. Contents of the terminal side previous correlation result information 155 are the same as those of the above described terminal side real correlation result information 153. That is, the terminal side previous correlation result information 155 is also an example of positioning basic information and the terminal side previous correlation result information storage file 154 is also an example of positioning basic information storing section.

The Doppler frequency 153d indicates a difference between an oscillation frequency at which the SPS satellites 12a-12d. generate the signals S1-S4., for example, 1575.42 megahertz (MHz) and a reception frequency of the terminal 20. The difference between the oscillation frequency and the reception frequency includes a Doppler effect generated by the relative movement of the SPS satellites 12a-12d. and the terminal 20 and drift caused by a frequency error of a crystal oscillator that generates a synchronization frequency of the terminal 20. That is, the Doppler frequency 153d of the embodiment has a broader meaning than the normal one.

As shown in FIG. 4, the terminal 20 has stored a calculated correlation information generation program 122 in the terminal first storage unit 120. The calculated correlation information generation program 122 is information for the terminal control unit 100 to generate calculated correlation information 156 indicating calculated values of the terminal side real correlation result information 153 as current correlation result information based on the terminal side previous correlation result information 155 and the time lapse from the previous generation time as time when the terminal side previous correlation result information 155 is generated. The calculated correlation information 156 is an example of calculated positioning basic information. Further, the calculated correlation information generation program 122 and the terminal control unit 100 are examples of calculated positioning basic information generating section.

As shown in FIG. 4, the calculated correlation information 156 contains a calculated code phase 156a. The terminal control unit 100 calculates the current code phase P1 based on equation A shown in FIG. 5C, for example, according to the calculated correlation information generation program 122. As expressed in the equation A, the terminal control unit 100 calculates the current code phase P1 based on code phase P0 and Doppler frequency F0 at the previous generation time t at which the terminal side previous correlation result information 155 is generated and the elapsed time Δt from the previous generation time t0 to the current time t1, for example. It is generally known that the equation A is valid if Δt is short, for example, on the order of 50 seconds (s).

Referring now to FIGS. 4 and 5C, the time lapse from the previous generation time to is timed by the terminal timing unit 110. That is, the terminal timing unit 110 is an example of a timing section. The terminal control unit 100 stores the generated calculated correlation information 156 in the terminal second storage unit 150.

As described above, the terminal side real correlation result information 153 is information obtained by actual measurement and the code phase 153c (see FIG. 5A) is an actual measurement value. On the contrary, the calculated code phase 156a is a calculated value generated based on the previous code phase contained in the terminal side previous correlation result information 155. The calculated value is valid if the time elapsed from the previous generation time is short as described above. Accordingly, the server 50 also can perform positioning calculation of the current position of the terminal 20 using the calculated value of the current code phase in a certain period without obtaining the terminal side real correlation result information 153 from the terminal 20 using the equation A (see FIG. 5C).

However, in the case where the moving velocity of the terminal 20 changes in a short period of time, sometimes the calculated code phase 156a obtained with the equation A largely differs from the actually measured code phase 153c. Accordingly, the terminal 20 is arranged to compare the actually measured code phase 153c and the calculated code phase 156a and, only when the difference between them falls within a certain range, allows the server 50 to perform positioning calculation using the calculated value of the current code phase.

As shown in FIG. 4, the terminal 20 has stored a within or without allowable range determination program 124 in the terminal first storage unit 120. The within or without allowable range determination program 124 is information for the terminal control unit 100 to determine whether the difference (hereinafter, referred to "code phase difference") between the actually measured code phase 153c and the calculated code phase 156a falls within an allowable range or not. That is, the within or without allowable range determination program 124 and the terminal control unit 100 are examples of a within or without allowable range determining section.

Specifically, the terminal control unit 100 determines whether the code phase difference falls within an allowable range, for example, within ten meters (m) or not. This allowable range is defined by a positioning error for which the terminal 20 makes a request to the server 50. For example, when the positioning error is within ten meters (m), the above described allowable range also falls within ten meters (m). This is based on that, when the errors of the code phases Sb (see FIG. 5B) with respect to the plurality of SPS satellites 12a-12d. used for positioning calculation are within ten meters (m), respectively, the positioning error of the current position of the terminal 20 also falls within ten meters (m).

Further, as described below, since the server 50 also uses the equation A in FIG. 5C, the terminal control unit 100 can determine with the within or without allowable range determination program 124 whether the calculated value of code phase calculated by the server 50 falls within the above described allowable range or not. If the terminal control unit 100 determines that the code phase difference falls without or outside the allowable range based on the within or without allowable range determination program 124, the unit adds a correlation estimatability flag "0" indicating that correlation estimation is impossible to the terminal side real correlation result information 153 as described below, and stores the information as real correlation result information for transmission 160 in a transmission data storage file 158 of the terminal second storage unit 150.

Figure 6A:
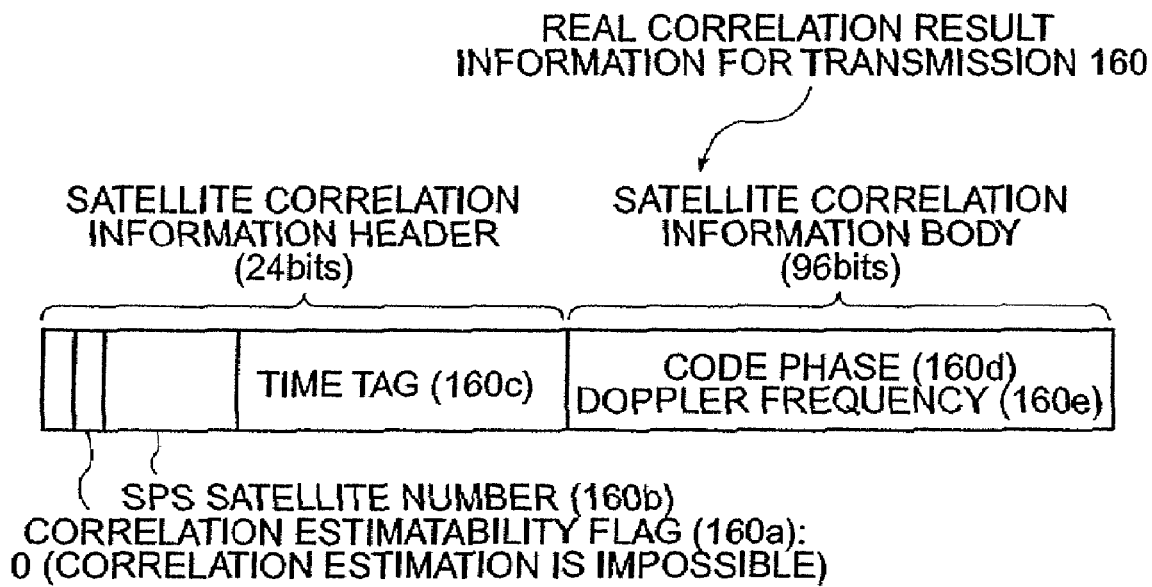
FIGS. 6A and 6B are views of diagrams showing an example of real correlation result information for transmission etc.
Figure 6B:
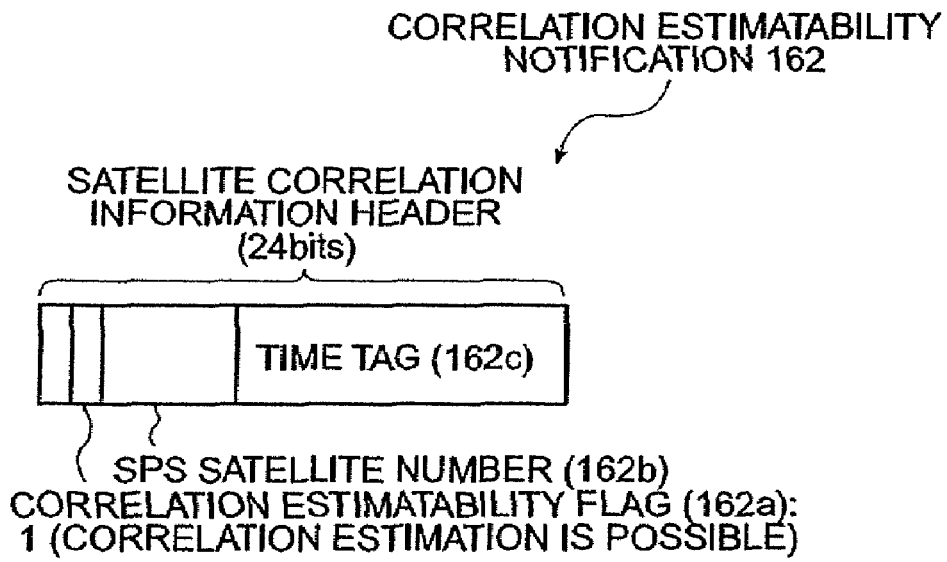

FIGS. 6A and 6B are views of schematic diagrams showing the real correlation result information for transmission 160 etc. As shown in FIG. 6A, the real correlation result information for transmission 160 is similar to the above described terminal side real correlation result information 153 (see FIG. 5A) but contains a correlation estimatability flag 160a. The correlation estimatability flag 160a contained in the real correlation result information for transmission 160 is set to "0" indicating that the correlation estimation is impossible. The indication that the correlation estimation is impossible means the server 50 can not use the calculated value based on the code phase at the previous positioning time for the positioning calculation of the current position of the terminal 20. As shown in FIG. 6A, the real correlation result information for transmission 160 has an amount of information of 120 bits, for example.

On the contrary, if the terminal control unit 100 determines that the code phase difference falls within the allowable range based on the validity determination program 124, the unit performs the following processing based on a correlation estimatability notification generation program 126 that has been stored in the terminal first storage unit 120. The correlation estimatability notification generation program 126 is information for the terminal control unit 100 to generate a correlation estimatability notification 162 based on a determination result of the above described within or without allowable range determination program 124 for the server 50 to generate estimated correlation information 260 (see FIG. 7), which will be described later, based on sever side previous correlation result information 253 (see FIG. 7), which will be described later. The estimated correlation information 260 is an example of estimated positioning basic information, and the correlation estimatability notification 162 is an example of estimated basic information. Further, the correlation estimatability notification generation program 126 and the terminal control unit 100 are examples of an estimated basic information generating section.

Specifically, the terminal control unit 100 generates the correlation estimatability notification 162 by adding a correlation estimatability flag to the satellite correlation information header (see FIG. 5A) of the terminal side real correlation result information 153, and stores the notification in the transmission data storage file 158 of the terminal second storage unit 150.

As shown in FIG. 6B, the correlation estimatability notification 162 is formed by adding a correlation estimatability flag 162a to the satellite correlation information header of the terminal side real correlation result information 153. The correlation estimatability flag 162a of the correlation estimatability notification 162 is set to "1" indicating that correlation and estimation are possible.

The indication that correlation estimation is possible means the server 50 can use the calculated value based on the code phase at the previous positioning time for the positioning calculation of the current position of the terminal 20. More specifically, it means that the positioning error of the positioning by the server 50 falls within ten meters (m), for example, requested by the terminal 20. As shown in FIG. 6B, the correlation estimatability notification 162 has an amount of information of 24 bits, for example.

As shown in FIG. 4, the terminal 20 stores a transmission data transmission program 128 in the terminal first storage unit 120. The transmission data transmission program 128 has information for the terminal control unit 100 to transmit transmission data 159 containing the real correlation result information for transmission 160 and/or the correlation estimatability notification 162 to the server 50. The transmission data 159 are an example of information for positioning. Further, the transmission data transmission program 128 and the terminal control unit 100 are examples of an information for positioning transmitting section.

The terminal control unit 100 transmits the transmission data 159 containing the real correlation result information for transmission 160 with respect to the SPS satellite 12a and the correlation estimatability notification 162 with respect to the SPS satellite 12b, 12c, and 12d, for example, based on the transmission data transmission program 128.

As described above, the amount of information of the correlation estimatability notification 162 is 24 bits and smaller than 120 bits of the amount of information of the real correlation result information for transmission 160. Accordingly, compared to the case where the terminal 20 transmits the real correlation result information for transmission 160 with respect to all of the SPS satellites 12a-12d., for example, the amount of information to be transmitted to the server 50 becomes smaller in the case where the terminal transmits the correlation estimatability notification 162 with respect to the SPS satellites 12b, 12c, and 12d as part of the SPS satellites, for example.

Thereby, in the server positioning system, the volume of data communication can be reduced.

Main Software Configuration of Server 50)

Figure 7:
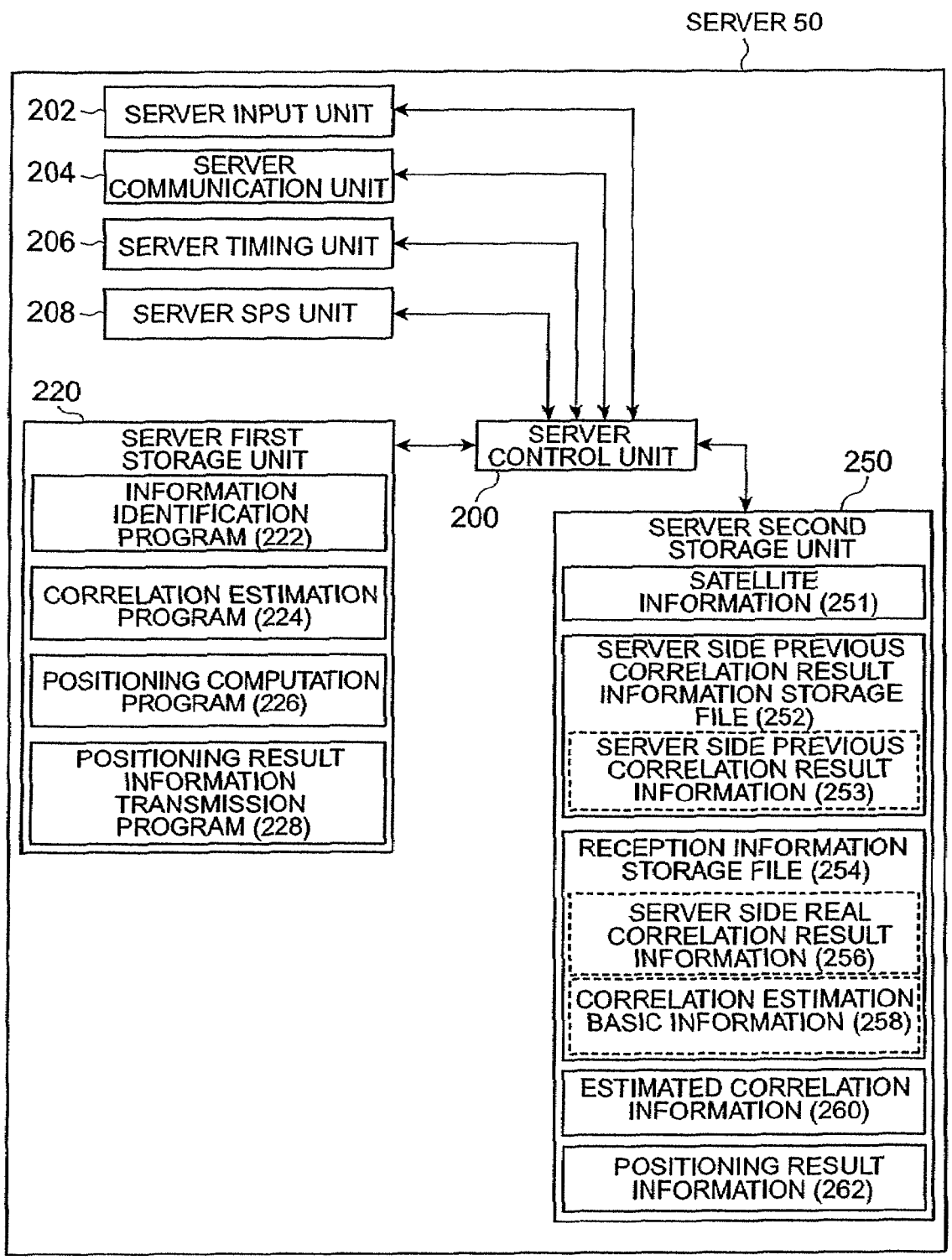
FIG. 7 is a view of a schematic diagram showing a main software configuration of the server.

FIG. 7 is a view of a schematic diagram showing a main software configuration of the server 50. FIGS. 8A to 8D are views of schematic diagrams showing examples of the previous correlation result information 253 etc.

As shown in FIG. 7, the server 50 has a server control unit 200 to control respective units, a server SPS unit 208 corresponding to the server SPS device in FIG. 3, a server input unit 202 corresponding to the input device 62 in FIG. 3, a server communication unit 204 corresponding to the server communication device 64 in FIG. 3, and a server timing unit 206 corresponding to the server clock 66 in FIG. 3.

As shown in FIG. 7, the server 50 has a server first storage unit 220 to store various kinds of programs and a server second storage unit 250 to store various kinds of information. As shown in FIG. 7, the server 50 has stored satellite information 251 in the server second storage unit 250. The satellite information 251 is information containing satellite orbit information etc. of the respective SPS satellites 12a-12d.

Figure 8A:
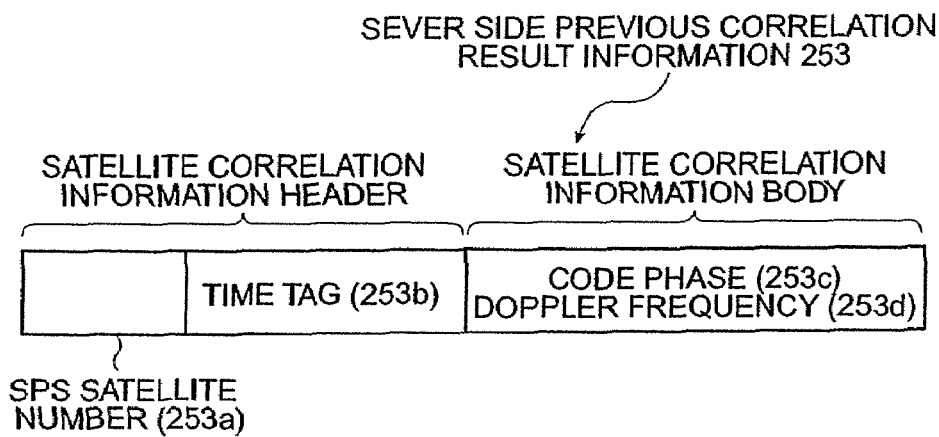
FIGS. 8A to 8D are views of diagrams showing an example of server side previous correlation result information etc.

As shown in FIG. 7, the server 50 has a server side previous correlation result information storage file 252 to store server side previous correlation result information 253. The server side previous correlation result information 253 is information indicating code phase etc. at the previous positioning of the position of the terminal 20 by the server 50. The contents of the server side previous correlation result information 253 are the same as those of the above described terminal side real correlation result information 153 (see FIG. 5A) as shown in FIG. 8A.

The server 50 receives the above described transmission data 159 (see FIG. 4) from the terminal 20 with the server communication device 204. That is, the server communication device 204 is an example of an information for positioning receiving section.

As shown in FIG. 7, the server 50 stores an information identification program 222 in the server first storage unit 220. The information identification program 222 has information for the server control unit 200 to identify the real correlation result information for transmission 160 (see FIG. 4) and the correlation estimatability notification 162 (see FIG. 4) contained in the transmission data 159.

Figure 8B:
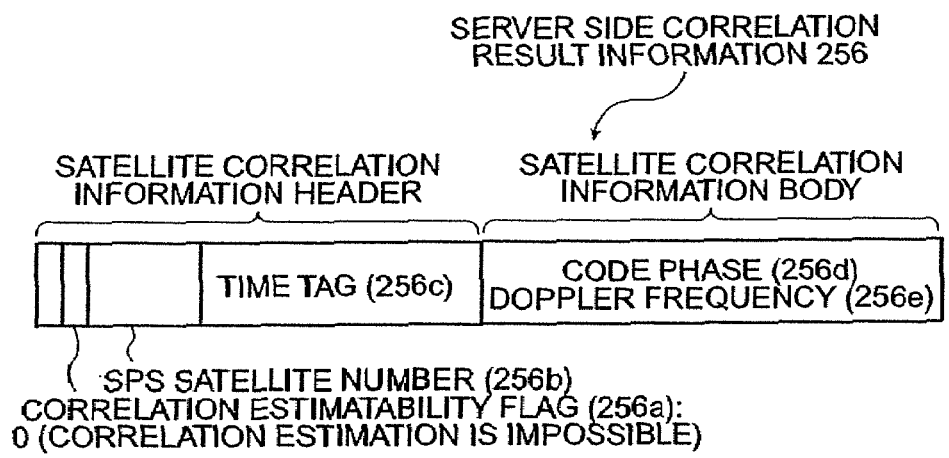
Figure 8C:
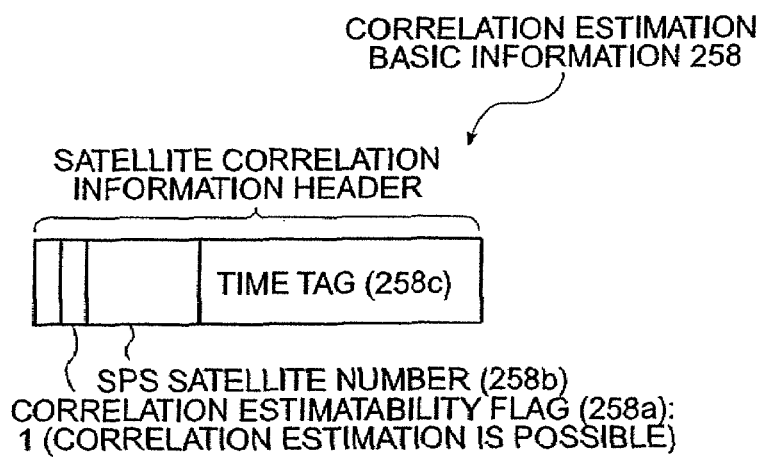
Figure 8D:
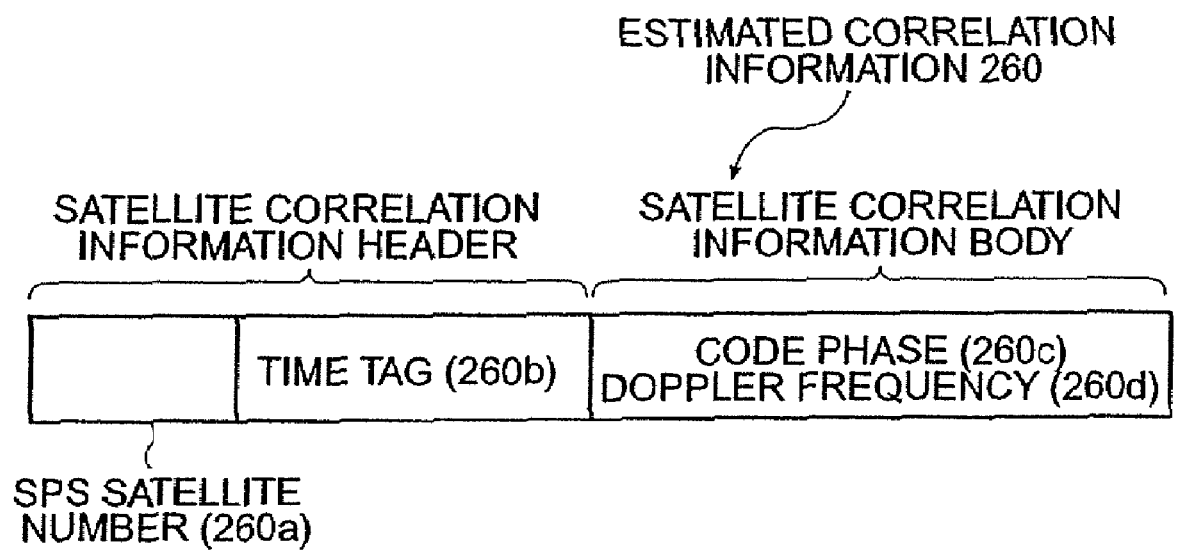

The server control unit 200 identifies the real correlation result information for transmission 160 and the correlation estimatability notification 162 based on the information identification program 222, and then, transmits the real correlation result information for transmission 160 as server side real correlation result information 256 shown in FIG. 8B and the correlation estimatability notification 162 as correlation estimation basic information 258 shown in FIG. 8C in a reception information storage file 254 of the server second storage unit 250. The server side real correlation result information 256 is also an example of current positioning basic information. Further, the correlation estimation basic information 258 is also an example of estimated basic information.

As shown in FIG. 7, the server 50 stores a correlation estimation program 224 in the server first storage unit 220. The correlation estimation program 224 is information for the server control unit 200 to generate estimated correlation information 260 shown in FIG. 8D based on the correlation estimation basic information 258.

The server control unit 200 first obtains the server side previous correlation result information 253 corresponding to the satellite number 258b of the correlation estimation basic information 258 based on the correlation estimation program 224. Then, the server control unit 200 calculates the code phase 260c that forms the estimated correlation information 260 using the equation A (see FIG. 5C) like the terminal 20.

Here, a code phase 253c of the server side previous correlation result information 253 is applied as P0, a Doppler frequency 253d of the server side previous correlation result information 253 is applied as F0, the time of a time tag 253b of the server side previous correlation result information 253 is applied as t0, and the time of a time tag 258c of the correlation estimation basic information 258 is applied as t1.

The above described estimated correlation information 260 is an example of estimated positioning basic information. Further, the correlation estimation program 224 and the server control unit 200 are examples of an estimated positioning basic information generating section.

The server control unit 200 stores the generated estimated correlation information 260 in the server second storage unit 250.

As described above, since the server 50 calculates the code phase 260c using the equation A in FIG. 5C like the terminal 20, if the terminal control unit 100 of the terminal 20 determines that the calculated code phase 156a generated by the terminal 20 falls within the allowable range, the code phase 260c to be generated by the server 50 also falls within the allowable range.

Unlike that which shown in the present embodiment, the server 50 may use another method without calculating the code phase 260c using the same equation A as the terminal 20 as long as the method is a calculation method by which, when the calculated code phase 156a calculated by the terminal 20 is within the allowable range, the code phase 256c to be calculated by the server 50 also falls within the allowable range.

As shown in FIG. 7, the server 50 stores a positioning computation program 226 in the server first storage unit 220. The positioning computation program 226 is information for the server control unit 200 to perform positioning calculation of the current position of the terminal 20 and to generate positioning result information 262 based on the server side real correlation result information 256 and the estimated correlation information 260. That is, the positioning computation program 226 and the server control unit 200 are examples of a positioning calculating section. Specifically, the server control unit 200 performs positioning calculation of the current position of the terminal 20 using the server side real correlation result information 256, the estimated correlation information 260, and the satellite information 251.

The server control unit 200 stores the generated positioning result information 262 in the server second storage unit 250.

As shown in FIG. 7, the server 50 stores a positioning result information transmission program 228 in the server first storage unit 220. The positioning result information transmission program 228 has information for the server control unit 200 to transmit the positioning result information 262 to the terminal 20. That is, the positioning result information transmission program 228 and the server control unit 200 are examples of a positioning result information transmitting section.

Heretofore, the configuration of the positioning system 10 according to the embodiment has been described. Below, an operation example of thereof will be described principally using FIGS. 9, 10, 11, and 12.

FIGS. 9 to 12 are views of schematic flowcharts showing the operation example of the positioning system 10 according to the present embodiment.

Figure 9:
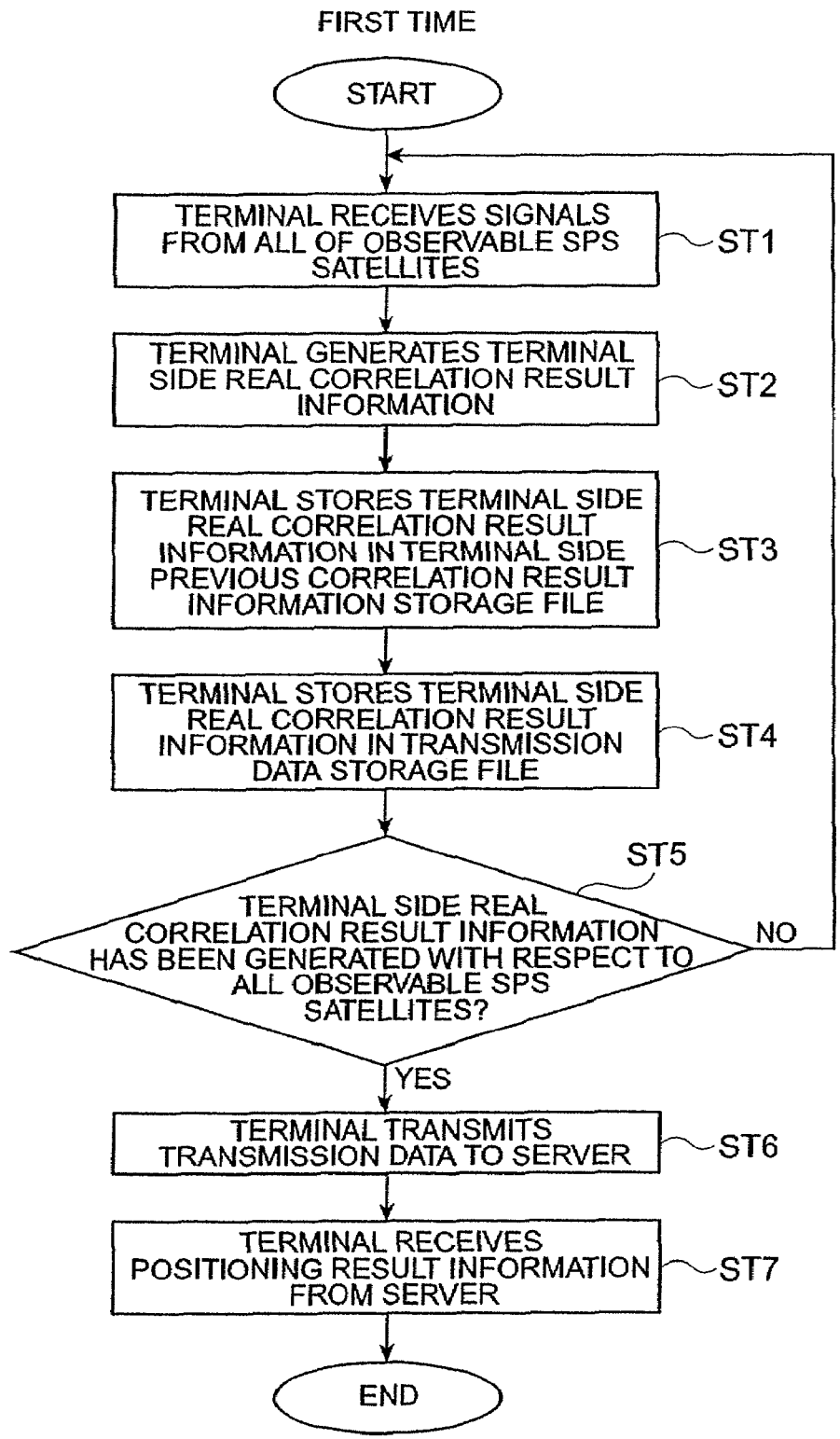
FIG. 9 is a view of a schematic flowchart showing an operation example of the positioning system.

At first, using FIG. 9, an operation example of the terminal 20 at the first positioning will be described.

First, the terminal 20 receives signals S1-S4. from all of the observable SPS satellites 12a-12d. (step ST1 in FIG. 9).

Subsequently, the terminal 20 generates the terminal side real correlation result information 153 (step ST2).

Subsequently, the terminal 20 replicates the terminal side real correlation result information 153, and stores one as the terminal side previous correlation result information 155 in the terminal side previous correlation result information storage file 154 (step ST3) and stores the other one as the real correlation result information for transmission 160 in the transmission data storage file 158 (step ST4).

Then, the terminal 20 determines whether it has generated the terminal side real correlation result information 153 with respect to all observable SPS satellites 12a-12d. or not (step ST5).

At step ST5, if the terminal 20 determines that it has generated the terminal side real correlation result information 153 with respect to all observable SPS satellites 12a-12d., the terminal transmits the transmission data 159 to the server 50 (step ST6).

The server 50 that has received the transmission data 159 generates the positioning result information 262 (see FIG. 7) by performing positioning calculation of the current position of the terminal 20 using the terminal side real correlation result information 153, and stores the terminal side real correlation result information 153 as the server side previous correlation result information 253 in the server side previous correlation result information storage file 252.

Subsequently, the terminal 20 receives the positioning result information 262 (see FIG. 7) from the server 50 (step ST7).

Figure 10:
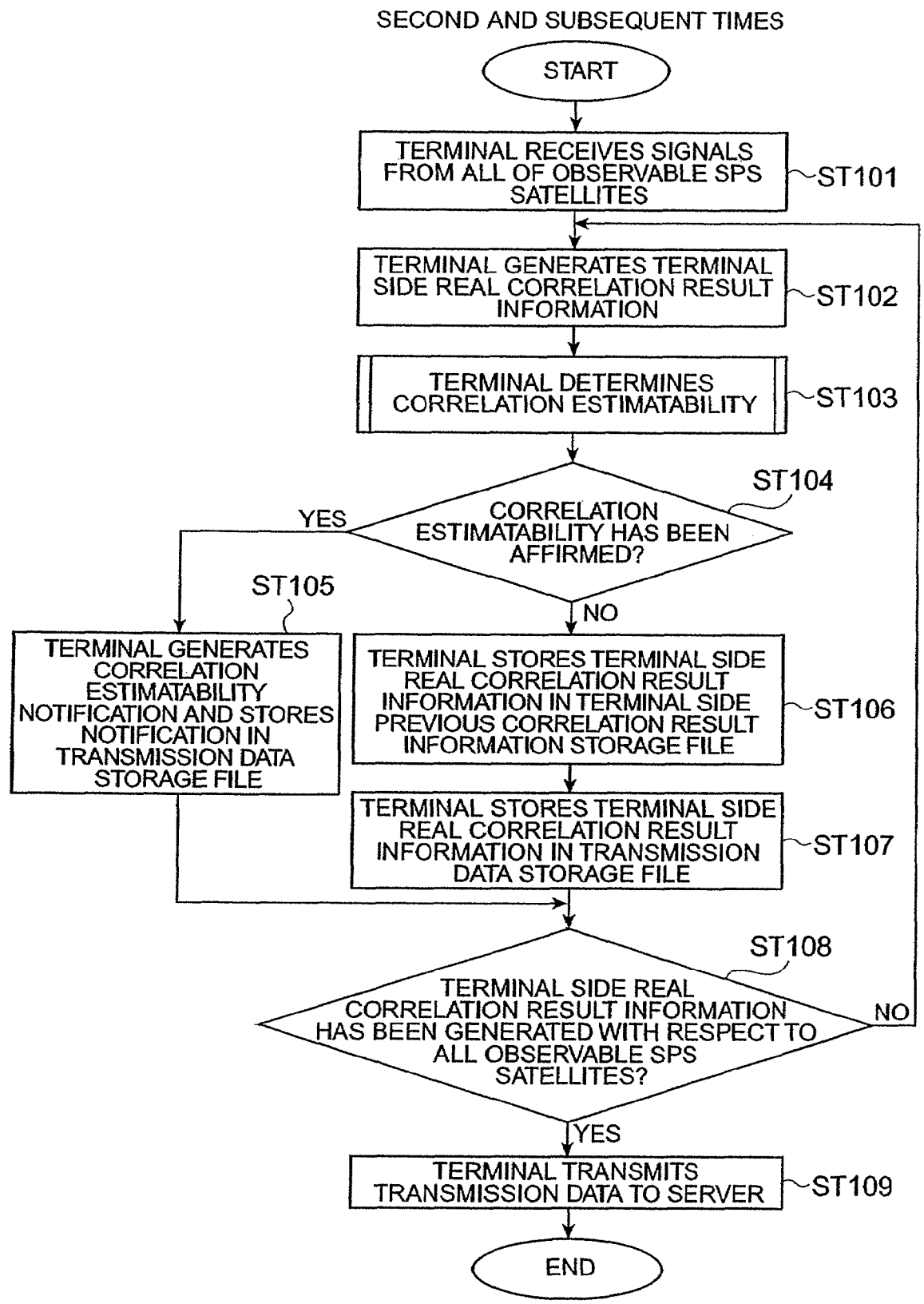
FIG. 10 is a view of a schematic flowchart showing an operation example of the positioning system.
Figure 11:
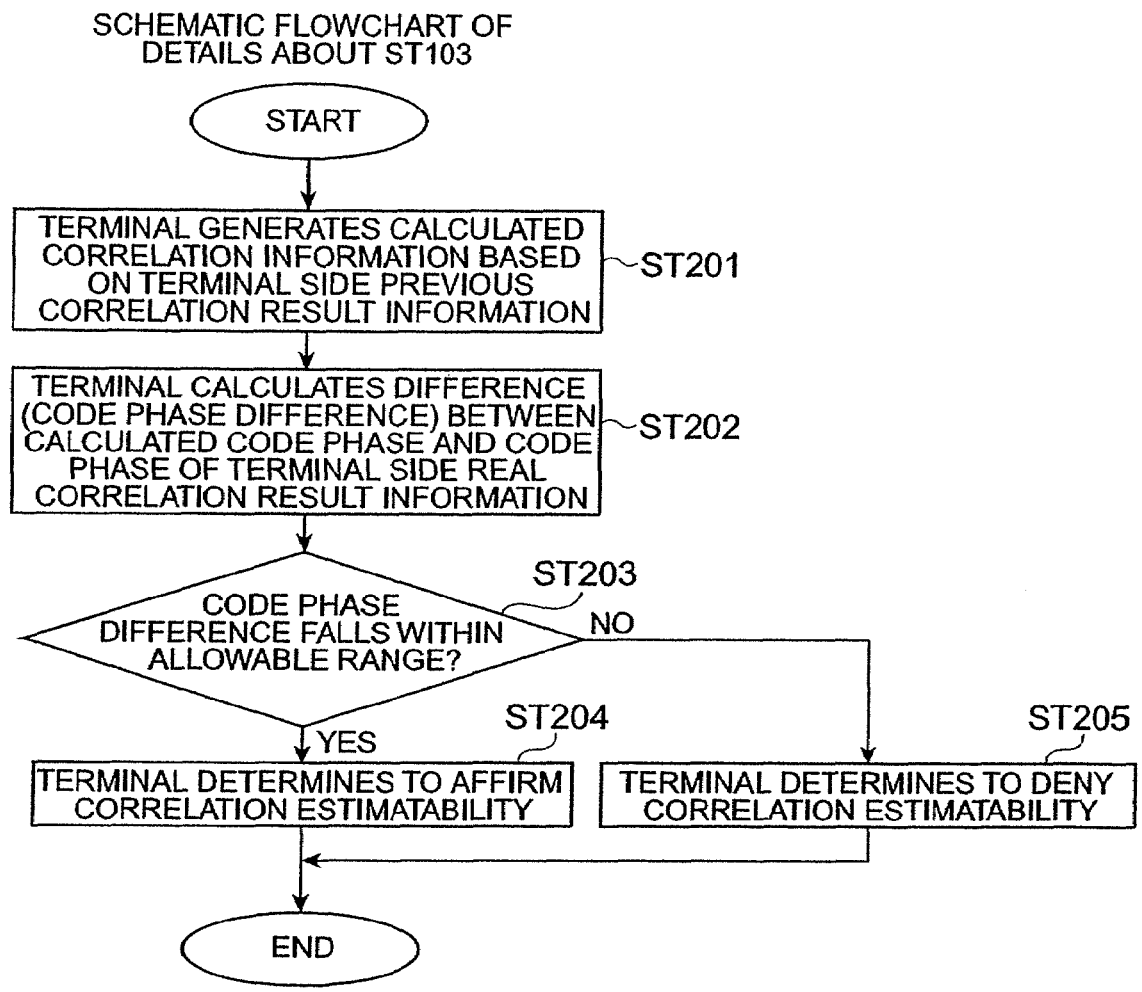
FIG. 11 is a view of a schematic flowchart showing an operation example of the positioning system.

Next, using FIGS. 10 and 11, an operation example of the terminal 20 at the second and subsequent positioning will be described.

First, the terminal 20 receives signals S1-S4. from all of the observable SPS satellites 12a-12d. (step ST101 in FIG. 10).

Subsequently, the terminal 20 generates the terminal side real correlation result information 153 (see FIG. 4) (step ST102).

Subsequently, the terminal 20 determines correlation estimatability (step ST103).

Details about the step ST 103 will be described using FIG. 11.

First, the terminal 20 generates calculated correlation information 156 based on the terminal side previous correlation result information 155 (step ST201). The step ST201 is an example of calculated positioning basic information generating step.

Subsequently, the terminal 20 calculates the difference (code phase difference) between the calculated code phase 156a (see FIG. 4) of the calculated correlation information 156 and the code phase 153c (see FIG. 5A) of the terminal side real correlation result information 153 (step ST202).

Subsequently, the terminal 20 determines whether the code phase difference falls within an allowable range or not (step ST203). The step ST203 is an example of within or without allowable range determining step.

At step ST203, the terminal 20 determines if the code phase difference falls within an allowable range, and then, determines to affirm the correlation estimatability (step ST204).

Alternatively, at step ST203, if the terminal 20 determines that the code phase difference falls without the allowable range, and then, it denies the correlation estimatability (step ST205).

Subsequently, terminal 20 determines whether it has affirmed the correlation estimatability or not (step ST 104 in FIG. 10), and, if it has affirmed the correlation estimatability, generates the correlation estimatability notification 162 and stores it in the transmission data storage file 156 (see FIG. 4) (step ST105). The step ST105 is an example of estimated basic information generating step.

Alternatively, if the terminal 20 has denied the correlation estimatability, it replicates two pieces of terminal side real correlation result information 153, and stores one as the terminal side previous correlation result information 155 in the terminal side previous correlation result information storage file 154 (step ST 106) and stores the other one as the real correlation result information for transmission 160 in the transmission data storage file 158 (step ST107).

Subsequently, the terminal determines whether it has generated the terminal side real correlation result information 153 with respect to all observable SPS satellites 12a-12d. or not (step ST 108). If it determines that it has not generated the terminal side real correlation result information 153 with respect to all observable SPS satellites 12a-12d., the respective steps the step ST101 and the subsequent steps are repeated.

On the other hand, at step ST 108, the terminal determines that it has generated the terminal side real correlation result information 153 with respect to all observable SPS satellites 12a-12d., the terminal transmits the transmission data 159 to the server 50 (step ST 109). The step ST109 is an example of an information for positioning transmitting step.

Figure 12:
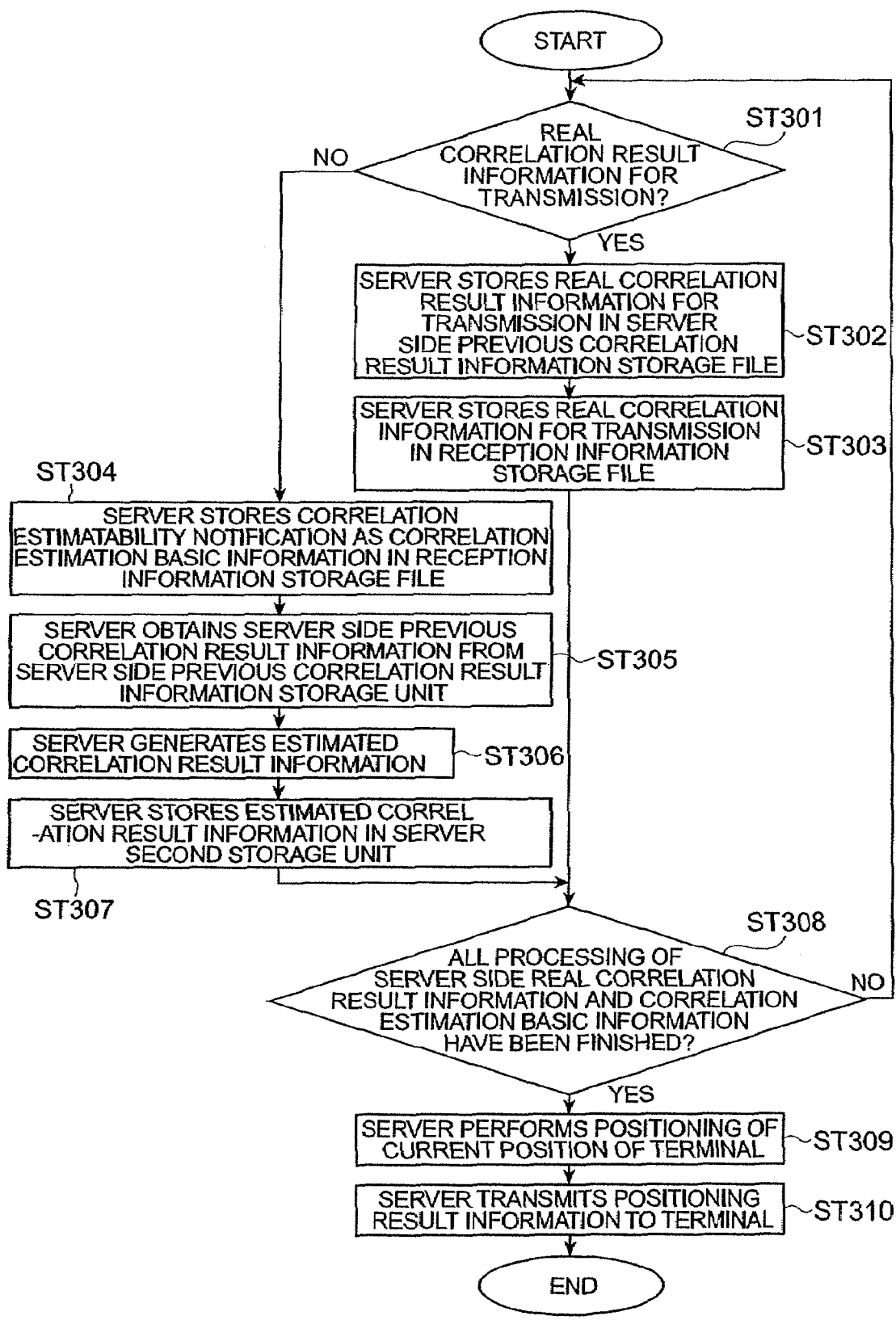
FIG. 12 is a view of a schematic flowchart showing an operation example of the positioning system.

The server 50 that has received the transmission data 159 determines whether the information contained in the transmission data 159 is the real correlation result information for transmission 160 or not (step ST301 in FIG. 12).

If the server 50 determines that the information contained in the transmission data 159 is the real correlation result information for transmission 160 at step ST301, it replicate two pieces of the real correlation result information for transmission 160 and stores one as the server side previous correlation result information 253 in the server side previous correlation result information storage file 252 (step ST302 in FIG. 12) and stores the other one as the server side real correlation result information 256 in the reception information storage file 254 (step ST303 in FIG. 12).

Alternatively, if the server 50 determines that the information contained in the transmission data 159 is not the real correlation result information for transmission 160 at step ST301, because the information is the correlation estimatability notification 162, the server stores it as the correlation estimation basic information 258 in the reception information storage file 254 (step ST304).

Subsequently, the server 50 obtains the server side previous correlation result information 253 corresponding to the identification code of the SPS satellite 12a, for example, of the correlation estimation basic information 258 stored at the step ST304 from the server side previous correlation result information storage file 252 (step ST305).

Subsequently, the server 50 generates the estimated correlation result information 260 (step ST306).

Subsequently, the server 50 stores the estimated correlation result information 260 in the server second storage unit 250 (step ST307).

Subsequently, the server 50 determines whether it has finished all processing of the server side real correlation result information 256 and the correlation estimation basic information 258 or not (step ST308), and, if the server determines it has finished all processing of the server side real correlation result information 256 and the correlation estimation basic information 258, it performs positioning calculation of the current position of the terminal 20 based on the server side real correlation result information 256 and the estimated correlation information 260 (step ST309) and transmits the positioning result information 262 to the terminal 20 (step ST310).

On the other hand, at step ST308, if the server determines it has not finished all processing of the server side real correlation result information 256 and the correlation estimation basic information 258, the processing at the above steps 301 and the subsequent steps is repeated.

As described above, since the amount of information of the correlation estimatability notification 162 (see FIG. 4) is smaller than the amount of information of the real correlation result information for transmission 160 compared to the case where the terminal 20 transmits only the real correlation result information for transmission 160 with respect to all of the SPS satellites 12a-12d., for example, the amount of information to be transmitted to the server 50 becomes smaller in the case where the terminal transmits the correlation estimatability notification 162 with respect to the SPS satellites with code phase difference within the allowable range.

Thereby, in the server positioning system, the volume of data communication can be reduced.

Program and Computer Readable Recording Medium

A control program for terminal device for allowing a computer to execute the calculated positioning basic information generating step, the validity determining step, the estimated basic information generating step, the information for positioning transmitting step, etc. in the above described operation example can be realized.

Further, a computer readable recording medium etc. in which such control program etc. for terminal device can be realized.

A program storage medium used for installing control programs etc. for information provision device and terminal device in a computer and enabling them to be executed by the computer can be realized not only by package media such as a flexible disk as a floppy disk (registered trademark), CD-ROM (Compact Disc Read Only Memory), CD-R (Compact Disc-Recordable), CD-RW (Compact Disc-Rewriteable), DVD (Digital Versatile Disc), for example, but also by a semiconductor memory, magnetic disk, magneto-optical disk, or the like in which programs are temporarily or permanently stored.

The invention is not limited to the above described respective embodiments. Furthermore, the above described respective embodiments may be combined with one another.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A positioning method for positioning using a terminal device and a server, comprising:
   generating first positioning basic information used for positioning at the terminal device based on a signal from a positioning satellite at a first time;
   generating second positioning basic information at the terminal device based on the signal from the positioning satellite at a second time;
   calculating third positioning basic information at the terminal device based on the first positioning basic information and a difference between the first and second times;
   transmitting calculation information, indicating that fourth positioning basic information is calculable, to the server from the terminal device when the difference is within a predetermined range, receiving the calculation information at the server;
   calculating the fourth positioning basic information at the server based on the calculation information;
   calculating a location of the terminal device at the server based on the fourth positioning basic information; and
   transmitting information indicating the location to the terminal device from the server.

2. A positioning method according to claim 1, where the predetermined range depends on an allowable range of positioning error.

3. A positioning method according to claim 1, further comprising
   transmitting the second positioning basic information to the server from the terminal device when the difference is out of the predetermined range,
   receiving the second positioning basic information at the server, and
   calculating a location of the terminal device at the server based on the second positioning basic information.

4. A positioning method for positioning using a server, comprising:
   generating first positioning basic information used for positioning based on a signal from a positioning satellite at a first time;
   generating second positioning basic information based on the signal from the positioning satellite at a second time;
   calculating third positioning basic information based on the first positioning basic information and a difference between the first and second times; and
   transmitting calculation information, indicating that fourth positioning basic information is calculable, to the server when the difference is within a predetermined range.

5. A terminal device communicable with a server, comprising:
   a storage unit that stores first positioning basic information used for positioning generated at a first time;
   a generator that generates second positioning basic information based on a signal from a positioning satellite at a second time;

a calculator that calculates third positioning basic information based on the first positioning basic information and a difference between the first and second times; and a transmitter that transmits calculation information, indicating that fourth positioning basic information is calculable, to the server when the difference is within a predetermined range.

6. An electronic device comprising the terminal device according to claim 5.

* * * * *